J. B. CESSNA.
ANIMAL TRAP.
APPLICATION FILED MAR. 14, 1911.
1,028,435.
Patented June 4, 1912.
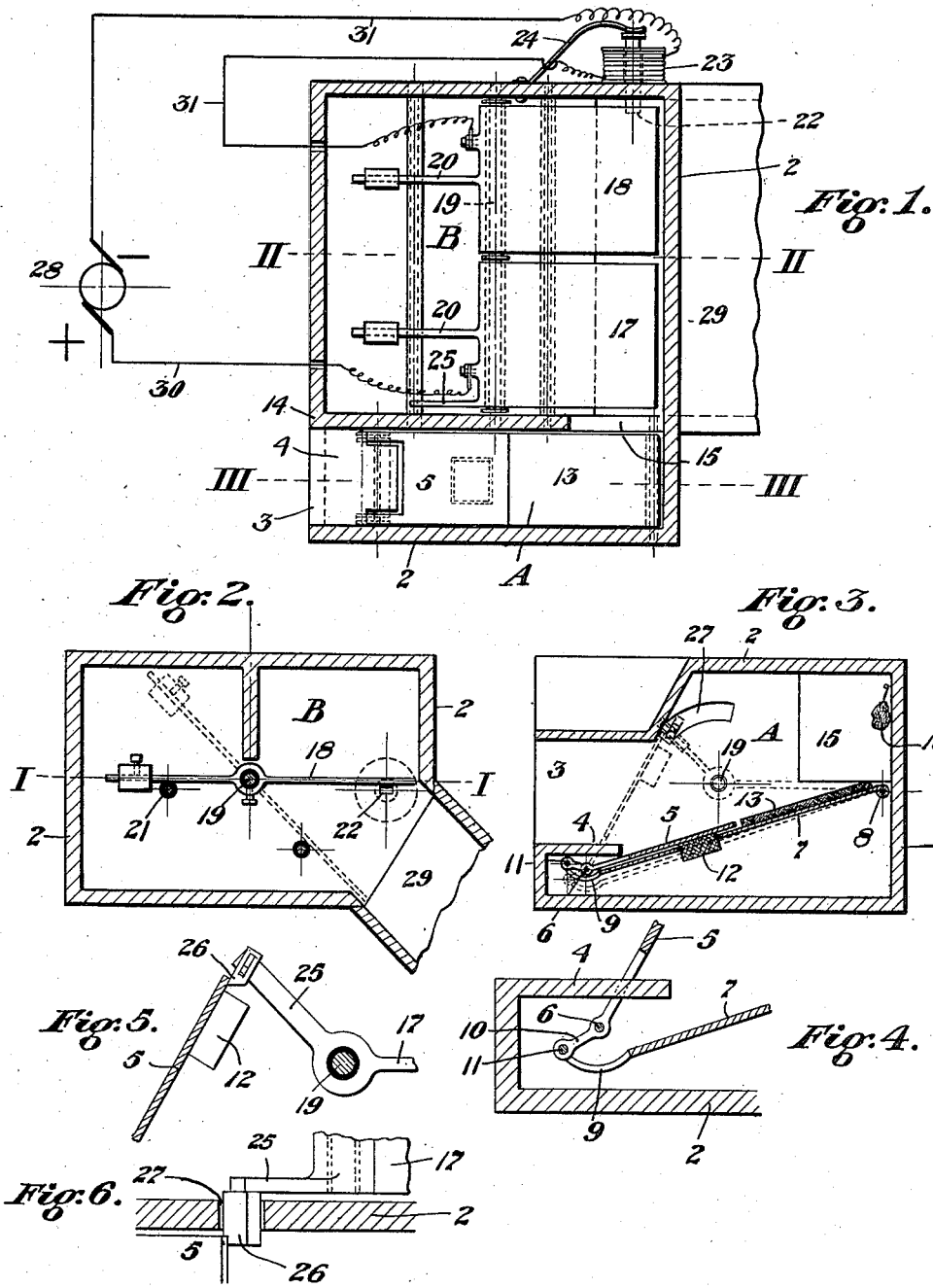
WITNESSES:
INVENTOR
ATTORNEY
COLUMBIA PLANOGRAPH CO., WASHINGTON, D. C.

UNITED STATES PATENT OFFICE.

JOHN B. CESSNA, OF PITTSBURGH, PENNSYLVANIA.

ANIMAL-TRAP.

1,028,435.

Specification of Letters Patent.

Patented June 4, 1912.

Application filed March 14, 1911. Serial No. 614,491.

*To all whom it may concern:*

Be it known that I, JOHN B. CESSNA, a citizen of the United States, residing at Pittsburgh, in the county of Allegheny and State of Pennsylvania, have invented certain new and useful Improvements in Animal-Traps, of which the following is a specification.

My invention consists of an improvement in animal traps, and has for its object to provide a device which will entrap the animal, as a rat or mouse, and will also electrocute it and deliver the body outwardly from the interior, and then be automatically re-set.

The device comprises a chambered box having an entering and entrapping compartment provided with a trap door and an operating platform and a latch for holding the trap door closed; also an electrocuting compartment having pivotally mounted insulated conducting plates in series circuit with a source of current, a retaining latch therefor, a controlling solenoid magnet for the latch also in series with said circuit, and various other features of construction, operable in the manner hereinafter more fully set forth.

In the drawings, Figure 1 is a horizontal sectional view of the device indicated by the line I. I. of Fig. 2. Fig. 2 is a vertical sectional view indicated by the line II. II. of Fig. 1. Fig. 3 is a similar sectional view indicated by the line III. III. of Fig. 1. Fig. 4 is an enlarged sectional detail view showing the trap door operating mechanism. Figs. 5 and 6 are detail views of the retaining and releasing latch for the trap door.

The apparatus is of box form having suitable surrounding walls 2, the interior being divided into two main compartments A and B. The compartment A is provided with an entrance opening 3 leading in from the outside, preferably over a short stationary platform 4. Inwardly beyond said entrance opening is a door 5 pivoted at 6, while beyond said door is a platform 7 pivoted at 8 adjacent to the opposite wall. Said door and platform normally lie across the width of the entrance chamber A at a slight upward inclination, as in Fig. 3, and platform 7 extends along underneath the door 5 and is connected by a lever terminal 9 with an extension 10 of the door 5 by a loose joint at 11, beyond the pivotal mounting 6 as shown. Door 5 is preferably counterweighted slightly, as at 12, to insure its normal open position, but is proportioned as to size and weight to insure its operation by slight downward pressure on extension 10.

The platform 7 is preferably provided with a moisture-containing pad 13 whereby to wet the feet of the animal and insure good electrical contact with the current transmission plates in the electrocution compartment B. Chambers A and B are separated by a partition 14, apertured at 15 adjacent to the inner wall 2, a bait 16 being secured at a position best adapted to lure the animal upon pad 13 of platform 7 and opposite the aperture 15.

Within chamber B are the positive and negative conducting plates 17, 18, fixedly secured to the rock shaft 19, insulated from said shaft and from each other, extending transversely across the middle portion of chamber B at one side of said rock shaft, and resting by counterweighted extensions 20 on an insulated rest bar 21. Extending underneath one edge of one of said plates 18 is a latch terminal 22 at the inner end of the armature of a solenoid magnet 23, said armature and latch terminal being normally pressed inwardly by a light spring 24.

Extending from plate 17, on shaft 19, adjacent to partition 14, is an arm 25 having a loosely mounted latch 26 with a beveled terminal adapted to be engaged by the edge of the door 5 when it is thrown up, as in Figs. 3 and 5. The latch 26 is loosely mounted on the end of arm 25, or otherwise suitably constructed, to adapt it to automatic engagement with the door, as will be readily understood, and an arc-shaped slot 27 is cut through the partition 14 for clearance.

28 is any source of electrical current as a generator, connected by conductor 30 to plate 17 and conductor 31 through magnet 23, to plate 18.

The operation is as follows: When the animal has passed over the depressed door 5 and onto platform 7, incidentally wetting its feet on moistened pad 13, its weight depresses the platform and also erects the trap door 5, which is engaged and retained by the latch 25. Finding itself confined, the animal will pass through opening 15 into chamber B and onto plates 17 and 18, thereby establishing a current through its body and becoming electrocuted. Simultaneously, the coil of magnet 23 being in series with the current, said magnet operates to withdraw the supporting latch 22, whereupon the weight of the dead animal causes the plates to drop, as indicated in dotted lines Fig. 2, and it is discharged outwardly through a conduit or chute 29 leading from the trap to any receptacle or point at the exterior. At the same time, arm 25 being thrown up, latch 26 is withdrawn and door 5 falls back to its normal position, when the trap is again ready for another victim.

If desired, the entrance chamber A may be omitted, and the aperture 15 used for an entrance directly into chamber B from the outside.

The advantages of the device consist in its simplicity of construction, certainty of execution, and automatic operation, being capable of continuous use as long as it is supplied with bait and current.

What I claim is:

1. In an animal trap, the combination of a casing having an entrance compartment and an execution compartment communicating therewith, a trap door operable to open and close the entrance compartment, a tilting electrocution platform in the execution compartment, and means connected therewith for engaging and disengaging the trap door, substantially as set forth.

2. In an animal trap, the combination of a casing having an entrance compartment and an execution compartment communicating therewith, a trap door operable to open and close the entrance compartment, a pivoted platform having a lever extension connected with the trap door, a tilting electrocution platform in the execution compartment, and means connected therewith for engaging and disengaging the trap door, as substantially set forth.

3. An animal trap having an entrance opening, a door therefor, a pivoted platform having a lever connection with said door, a pair of pivotally mounted platforms of conducting material, a latch for the door operable thereby, and means supplying current to each of said platforms, substantially as set forth.

4. An animal trap having an entrance opening, a door therefor, a pivoted platform having a lever connection with said door, a pair of pivotally mounted platforms of conducting material, a supporting latch and magnet therefor, a latch for the entrance door operable by the said platforms, and means supplying current to each of said platforms, substantially as set forth.

5. In an animal trap, a casing having an inner chamber and an entrance opening communicating therewith, a trap door and a connected platform operable to open and close the entrance opening, a pair of separated supporting insulated contact plates pivotally mounted in the inner chamber, a lever connected therewith having a latch for engaging the trap door, a magnet and latch engaging one of the contact plates, and means for establishing circuit through said magnet and plates when circuit is closed between the plates, substantially as set forth.

6. In an animal trap, a casing having an inner chamber and an entrance opening communicating therewith, a trap door and connected platform operable to open and close the entrance opening, a pair of separated supporting insulated contact plates pivotally mounted in the inner chamber, a lever connected therewith having a latch for engaging the trap door, a magnet and latch engaging one of the contact plates, means for establishing circuit through said magnet and plates when circuit is closed between the plates, and an inclined chute leading from the inner chamber, substantially as set forth.

7. In an animal trap, a pair of pivotally mounted contact plates insulated and separated from each other, a supporting device, an electrically operated element for withdrawing said device, and means for establishing a circuit through said plates and element when said plates are electrically connected substantially as set forth.

8. In an animal trap, a pair of pivotally mounted contact plates insulated and separated from each other, a supporting device, an electrically operated element for withdrawing said device, means for establishing a circuit through said plates and element when said plates are electrically connected, and a discharge chute in position to receive a body by gravity from said plates, substantially as set forth.

In testimony whereof I hereunto affix my signature in the presence of two witnesses.

JOHN B. CESSNA.

Witnesses:
C. M. CLARKE,
CHAS. S. LEPLEY.